US009376544B2

(12) United States Patent
Adam et al.

(10) Patent No.: US 9,376,544 B2
(45) Date of Patent: *Jun. 28, 2016

(54) SILICON DIOXIDE DISPERSION

(71) Applicant: EVONIK HANSE GMBH, Geesthacht (DE)

(72) Inventors: Johannes Adam, Dresden (DE); Christof Roscher, Hamburg (DE); Christian Eger, Bardowick (DE); Thorsten Adebahr, Hamburg (DE); Robert Wieczorreck, Barsbüttel (DE); Manfred Pyrlik, Wohltorf (DE)

(73) Assignee: Evonik Hanse GmbH, Geesthacht (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/512,017

(22) Filed: Oct. 10, 2014

(65) Prior Publication Data

US 2015/0094386 A1 Apr. 2, 2015

Related U.S. Application Data

(63) Continuation of application No. 12/191,294, filed on Aug. 13, 2008, now abandoned, which is a continuation of application No. 10/469,254, filed as application No. PCT/EP02/02198 on Feb. 28, 2002, now abandoned.

(30) Foreign Application Priority Data

Feb. 28, 2001 (EP) ..................................... 01104919

(51) Int. Cl.
*C08K 3/36* (2006.01)
*C08K 7/18* (2006.01)

(52) U.S. Cl.
CPC ... *C08K 3/36* (2013.01); *C08K 7/18* (2013.01); Y10T 436/10 (2015.01)

(58) Field of Classification Search
CPC ............................. C08K 3/36; C08K 2201/003
See application file for complete search history.

(56) References Cited

U.S. PATENT DOCUMENTS

| 3,880,714 | A | * | 4/1975 | Babson ................. G01N 33/86 435/13 |
| 4,755,425 | A | * | 7/1988 | Huang ................ C08G 18/0823 106/13 |
| 5,284,900 | A | * | 2/1994 | Izubayashi et al. ........... 524/492 |
| 5,332,779 | A | * | 7/1994 | Mohri et al. .................. 524/790 |
| 5,370,892 | A | | 12/1994 | El-Nokaly et al. |
| 5,403,535 | A | | 4/1995 | Blizzard et al. |
| 5,470,512 | A | * | 11/1995 | Noji et al. ....................... 264/4.1 |
| 5,684,407 | A | | 11/1997 | Zdanys, Jr. et al. |
| 5,853,809 | A | | 12/1998 | Campbell et al. |
| 5,885,485 | A | | 3/1999 | Brekau et al. |
| 5,910,522 | A | | 6/1999 | Schmidt et al. |
| 5,939,471 | A | * | 8/1999 | Watanabe et al. ............. 523/334 |
| 5,998,504 | A | | 12/1999 | Groth et al. |
| 6,410,123 | B1 | * | 6/2002 | Otani ..................... B41M 5/506 427/152 |
| 2007/0191556 | A1 | | 8/2007 | Eger |
| 2008/0306203 | A1 | | 12/2008 | Adam et al. |

FOREIGN PATENT DOCUMENTS

| DE | 30 14 411 | 4/1980 |
| DE | A 43 38 361 | 11/1993 |
| DE | A 197 19 948 | 5/1997 |
| EP | A 0 145 308 | 11/1984 |
| EP | A 0 687 715 | 1/1995 |
| EP | A 195 40 623 | 10/1995 |
| EP | A 0 768 351 | 4/1996 |
| EP | B 832 947 | 9/1997 |
| EP | A 0 805 186 | 11/1997 |
| EP | A 0872 500 | 4/1998 |
| EP | A 0 943 664 | 3/1999 |
| EP | A 0 982 766 | 7/1999 |
| EP | A 1 236 765 | 2/2001 |
| EP | A 1 457 509 | 3/2003 |
| GB | A 2 047 721 | 4/1980 |
| JP | 05287082 A * | 11/1993 |
| WO | A 96/36665 | 11/1996 |
| WO | WO 98/38251 | 9/1998 |

(Continued)

OTHER PUBLICATIONS

Machine translation of JP 05-287082 A, dated Nov. 2, 1993.*
Nakano, et al., "Sphere to Rod Transition of Micelles Formed by Amphiphilic Diblock Copolymers of Vinyl Ethers in Aqueous Solution" Macromolecules, 32:697-703 (1999).
Poppe, et al., "Structural Investigation of Micelles Formed by an Amphiphilic PEP-PEO Block Copolymer in Water" Macromolecules 30:7462-7471 (1997).

(Continued)

*Primary Examiner* — Vickey Nerangis
(74) *Attorney, Agent, or Firm* — Casimir Jones, S.C.; Mary Ann Brow

(57) ABSTRACT

The invention relates to a silicon dioxide dispersion that comprises a) an outer flowable phase containing 1) polymerizable monomers, oligomers and/or prepolymers that can be converted to polymers by non-radical reaction; and/or 2) polymers, and b) a disperse phase containing amorphous silicon dioxide. The inventive dispersion is characterized in that the average particle size $d_{max}$ of the silicon dioxide as measured by small angle neutron scattering (SANS) is between 3 and 50 nm at a maximum half-width of the distribution curve of 1.5 $d_{max}$. Such a silicon dioxide dispersion can be easily manufactured even at higher concentrations of the disperse phase and can be used to produce polymer materials that have advantageous properties, especially advantageous mechanical properties.

30 Claims, No Drawings

(56) References Cited

FOREIGN PATENT DOCUMENTS

| WO | WO A 99/52964 | 10/1999 |
|----|---------------|---------|
| WO | WO 01/87787   | 11/2001 |
| WO | WO 01/87788   | 11/2001 |

OTHER PUBLICATIONS

Likos, et al., "Ordering phenomena of star polymer solutions approaching the θ state" Physical Review E 54:6299-6307 (1998).

Bergna, et al., "Colloidal Silica" Ullmann/s Encyclopedia of Industrial Chemistry 2002, Wiley-VCH Verlay GmbH & Co. KGaA.

Adebahr, et al., "Reinforcing nanoparticles in reactive resins" 6th Numberg Congress Apr. 2001.

Daniels, et al., "Silane Adsorption Behavior, Microstructure, and Properties of Glycidoxypropyltrimethoxysilane-Modified Colloidal Silica Coatings" Journal of colloid and interface science 205:191-200 (1998).

Enzyklpadie Naturwissenschaft and Technik, 1981 Verlag Moderne Industrie, p. 3015.

Nissan Chemical, SnowTex, Colloidal Silica, information pamphlet, retrieved Jun. 5, 2014, www.nissanchem-usa/snowtex.php, 5 pages.

Technical Bulletin, AEROSIL(R) for Solvent-Free Epoxy Resins, Degussa, No. 27, provided Aug. 28, 2009, 24 pages.

Werth et al., "Agglomeration of Charged Nanopowders in Suspensions," Powder Technology, 2003, 133:106-112.

Technical Bulletin, AEROSIL(R) for Unsaturated Polyester Resins and Vinyl Ester Resins, Degussa, No. 54, provided Nov. 3, 2010, 31 pages.

Informational Bulletin, There's More to It Than You Think HDK(R)—Pyrogenic Silica, Wacker Silicones, provided Nov. 3, 2010, 18 pages.

\* cited by examiner

SILICON DIOXIDE DISPERSION

This application is a Continuation of U.S. patent application Ser. No. 12/191,294, filed Aug. 13, 2008, which is a Continuation of U.S. patent application Ser. No. 10/469,254, filed Mar. 15, 2004, which is a National Stage application under 35 U.S.C. §371 of International Application No. PCT/EP01/02198, filed Feb. 28, 2002, which claims priority to European Application Ser. No. 01 104 919.4, filed Feb. 28, 2001.

The invention relates to a silicon dioxide dispersion comprising:
a) an external fluid phase comprising
  a1) polymerizable monomers, oligomers and/or prepolymers convertible to polymers by nonradical reactions; and/or
  a2) polymers,
b) a disperse phase comprising amorphous silicon dioxide.

It is known to provide polymeric materials such as polyurethanes, polyureas or reactive resins, as they are known, with fillers in order to modify certain properties of the polymeric material. By way of example it is possible in this way to improve impact strength, flexural strength, hardness or electrical insulation capacity.

It is already known to use silica or silicon dioxide ($SiO_2$) as a filler in polymers. Various processes for preparing $SiO_2$ fillers are known from prior public use.

Natural (mineral) $SiO_2$ can, for example, be brought to desired particle size by grinding and mixed with the polymer or a polymer precursor. Ground $SiO_2$ generally has a very broad particle size distribution and an irregular particle structure. Particle sizes of less than 1 µm are difficult to obtain or unobtainable by mechanical comminution of the $SiO_2$.

It is further known to precipitate $SiO_2$ from aqueous alkali metal silicate solutions by acidification and then to dry it. This precipitated $SiO_2$ is mixed with the polymer or a precursor. Here again, irregular particle structures with very broad particle size distributions are obtained.

Another possibility is to prepare pyrogenic silica by flame hydrolysis of silicon halogen compounds. This produces particles of very complex morphology and extremely broad particle size distribution, since the primary particles produced in the flame hydrolysis undergo partial agglomeration and form other associated superstructures. Pyrogenic silica, moreover, is expensive to prepare.

It is additionally known to hydrolyze and condense organo functional silanes (especially alkoxy silanes) in order to prepare aqueous or aqueous-alcoholic silica sols and to mix these sols with a polymer precursor. Water and/or alcohol can then be removed from the mixture. This process is expensive and difficult to control on an industrial scale.

The processes depicted have the drawback, furthermore, that the targeted preparation of $SiO_2$ fillers with a monomodal, narrow particle size distribution is impossible; this drawback is particularly pronounced in the case of the three first-mentioned processes. The result of this is that dispersions of the filler in polymer precursors exhibit unwanted rheological properties, in particular a high viscosity, even at relatively low filler concentrations, and these properties make processing more difficult.

The present invention is based on the object of providing a silicon dioxide dispersion of the type specified at the outset which is easy to process even at relatively high filler concentrations, which produces an effective improvement in mechanical and/or electrical properties of the polymer end product, and which can be prepared from a process, likewise in accordance with the invention from inexpensively obtainable starting materials.

The silicon dioxide dispersion accordingly comprises
a) an external fluid phase comprising
  a1) polymerizable monomers, oligomers and/or prepolymers convertible to polymers by nonradical reactions; and/or
  a2) polymers,
b) a disperse phase comprising amorphous silicon dioxide, and is characterized in that the average particle size $d_{max}$ of the silicon dioxide as measured by means of small-angle neutron scattering (SANS) is between 3 and 50 nm at a maximum half-width of the distribution curve of 1.5 $d_{max}$.

The process of the invention for preparing such dispersion is distinguished by the following steps:
a) introducing an aqueous silicate solution,
b) polycondensing the silicate to a particle size of 3-50 nm,
c) adjusting the resulting silica sol to an alkaline pH,
d) optionally concentrating the sol,
e) mixing the sol with constituents of the external fluid phase of the dispersion,
f) optionally removing water and/or other solvent constituents from the dispersion.

To start with, some of the terms used in the context of the invention will be elucidated:

The so-called external phase of the silicon dioxide dispersion of the invention is fluid. This means that at customary processing temperatures (e.g., 18 to 300° C., preferably 18 to 100° C.) it is either liquid or else sufficiently fluid or viscous to be subjected to the desired further processing, in particular mixing with further constituents of the polymeric material to be produced or shaping as part of processing.

This external phase comprises, in accordance with one aspect of the invention, polymerizable monomers, oligomers and/or prepolymers. Prepolymers are relatively small polymer units which are able to crosslink and/or polymerize to form larger polymers. "Polymerizable" means that in this external phase there are still polymerizable and/or crosslinkable groups which are able to enter into a polymerization reaction and/or crosslinking reaction in the course of further processing of the dispersion. The external phase comprises polymerizable constituents which are convertible to polymers by non radical reactions. This means that the polymerization to polymers does not proceed by way of a free-radical mechanism. Preference is given instead of this to polycondensations (polymerization occurring in stages with the elimination of secondary products) or polyadditions (polymerizations proceeding in stages without elimination of secondary products). Likewise provided by the invention are anionic or cationic polymerizable constituents in the external phase. Not provided by the invention in any case are dispersions having external phases which comprise polymerizable acrylates or methacrylates as a substantial constituent.

Polymerizable acrylates or methacrylates are all monomeric, oligomeric or prepolymeric acrylates or methacrylates which in the course of the production of a material from the dispersion are deliberately subjected to a further polymerization. One example of the polyadditions is the synthesis of polyurethanes from diols and isocyanates, one example of polycondensations is the reaction of dicarboxylic acids with diols to form polyesters.

In accordance with a further aspect of the invention the external fluid phase may comprise a polymer or two or more polymers. Polymers in this sense are macromolecules which are no longer reactive and which therefore do not react to form larger polymer units.

The material in question may in particular be a melted and/or dissolved material which can be converted to said material again physically by cooling and/or removal of the solvent. In this version of the invention, therefore, the dispersion of the invention does not cure chemically to form a polymer; instead, use is made as the external phase of a ready-produced polymer which for the purpose of preparation of the dispersion is brought by merely physical means (thermally and/or by solvent addition) into a liquid or viscous aggregate state, in order to allow the mixing in of the disperse phase. Following the preparation of the dispersion a material comprising the disperse phase, and whose polymer composition is substantially unchanged in comparison with the polymeric material originally employed as external phase, can be produced by cooling and/or by removal of the solvent. "Substantially unchanged" means that, in the course of the conversion of the original material into the external phase (thermally or by solvent addition) and of the resolidification which takes place after the disperse phase has been mixed in, to form a material of the invention (by cooling or stripping of the solvent), there is no deliberate further polymerization; instead, at the most, polymer reactions occur to a slight extent as secondary reactions. Example 21 in the experimental section is an example of this version of the invention.

The disperse phase comprises amorphous silicon dioxide. Preferably it consists essentially of amorphous silicon dioxides. The method employed for measuring the amorphous silicon dioxide particles is that of small-angle neutron scattering (SANS). This measurement method is familiar to the skilled worker and requires no more detailed elucidation here. In the SANS measurement a particle size distribution curve is contained in which the volume fraction of particles of corresponding size (diameter) is parted against the particle diameter. Defined as the average particle size for the purposes of the invention is the peak of such a SANS distribution curve, i.e., the greatest volume fraction with particles of corresponding diameter.

The half-width of the distribution curve is the width (in nm) of the distribution curve at half its height, i.e., at the half of the particle volume fraction at the distribution curve peak $d_{max}$, or, expressed alternatively, the width of the distribution curve at half the height of the Y axis (relative to the height of the curve at $d_{max}$).

The average particle size is preferably been 6 and 40 nm, more preferably between 8 and 30 nm, with particular preference between 10 and 25 nm. Silicon dioxide dispersions according to the invention have good processing properties and, even where the concentration of the disperse phase is relatively high, exhibit a rheology which approximates to the ideal Newtonian flow behavior. At the given particle concentration they generally have a lower viscosity than corresponding prior art dispersions.

The half-width of the distribution curve is, in accordance with the invention, preferably not more than $1 \cdot 2\, d_{max}$, more preferably not more than $d_{max}$, with particular preference not more than $0.75\, d_{max}$.

The fraction of the external phase as a proportion of the dispersion can in the context of the invention be between 20 and 90% by weight, preferably from 30 to 80% by weight, more preferably from 40 to 70% by weight. Accordingly the fraction of the disperse phase can be between 10 and 80% by weight, preferably from 20 to 70% by weight, more preferably from 30 to 60% by weight. The silicon dioxide particles of the dispersion of the invention are preferably substantially spherical. The dispersion may further comprise auxiliaries selected from the group consisting of solvents, plasticizers, crosslinkers, catalysts, stabilizers, dispersants, curing agents, reaction mediators and agents for influencing the fluidity of the dispersion.

With particular preference the dispersion of the invention is water-free, i.e., it contains only small traces of water which remain even after conventional methods of removing water, described in more detail below, have been performed.

The external phase may be one of two or more reaction constituents for the preparation of a polymer. The polymers can be thermoplastics or thermosets. By way of example mention may be made of polyurethanes, polyureas, epoxy resins, polyester resins, polysiloxanes (silicones), and, in general, reactive resins for the production of thermosets. It can, for example, comprise a substance selected from the group consisting of polyols, polyamines, linear or branched polyglycol ethers, polyesters and polylactones.

A multiplicity of known compounds can be used as monomeric polyols for the purpose of the invention.

Owing to their ready availability and advantages, particularly the excellent compatibility and good processing properties of the resultant products, polyols used with preference for the external phase of the dispersion of the invention are linear or branched aliphatic glycols, the external phase of the $SiO_2$ dispersion featuring with particular preference ethylene glycol, 1,2- or 1,3-propanediol, 1,2- or 1,4-butanediol, 1,6-hexanediol, 2,2,4-trimethylpentane-1,3-diol and/or neopentylglycol.

Use is further made, as aliphatic polyols, of, preferably, glycerol, trimethylolpropane, and also sugar alcohols, especially erythritol, xylitol, mannitol and/or sorbitol. The external phase may further comprise, as preferred polyols, one or more alicyclic polyols, especially 1,4-cyclohexanedimethanol, and/or sucrose.

Suitable polymeric polyols for the external phase include preferably those having an average molecular weight of from 200 to 20,000, the polymeric polyol preferably being one based on akylene glycol (polymeth)acrylates. The external phase of the dispersion of the invention may further comprise preferably polymeric polyols which are obtained by hydrolysis or partial hydrolysis of vinyl-ester-containing polymers.

Suitable polyethers for the external phase include in particular the linear or branched polyglycol ethers obtainable by ring-opening polymerization of cyclic ethers in the presence of polyols, e.g., the aforementioned polyols; of these polyglycol ethers, preference is given, on account of their relatively easy availability, to polyethylene glycol, polypropylene glycol and/or polytetramethylene glycol or the copolymers thereof.

Suitable polyesters for the external phase of the dispersion of the invention include those based on polyols and aliphatic, cycloaliphatic and aromatic polyfunctional carboxylic acids (for example, dicarboxylic acids), and specifically all corresponding saturated polyesters which are liquid at temperatures of 18 to 300° C., preferably 18 to 150° C.: preferably succinic esters, glutaric esters, adipic esters, citric esters, phthalic esters, isophthalic esters, terephthalic esters and/or the esters of the corresponding hydrogenation products, with the alcohol component being composed of monomeric or polymeric polyols, for example, of those of the abovementioned kind.

Further polyesters which can be used in accordance with the invention are aliphatic polylactones, preferably ε-polycaprolactones, and/or polycarbonates, which for example are obtainable by polycondensation of diols with phosgene. For the external phase it is preferred to use polycarbonates of bisphenol A having an average molecular weight of from 500 to 100,000.

Instead of the aforementioned polyols, polyethers and saturated polyesters, it is also possible for the purpose of the invention to use mixtures of the aforementioned classes of substance for the external phase of the dispersion of the invention. The use of such mixtures may be an advantage, for example, in respect of a reduction in the glass transition temperature and/or melting temperature of the resultant products. For the purpose of further reaction the aforementioned polyethers and polyesters may carry functional groups, such as hydroxyl, carboxyl, amino or isocyanato groups, for example.

For the purpose of influencing the viscosity of the external phase, in particular the viscosity reduction or the liquefaction, the polyols, polyethers and saturated polyesters and/or mixtures thereof provided in accordance with the invention for the external phase may where appropriate be admixed with further suitable auxiliaries, particularly solvents, plasticizers, diluents and the like.

In the context of the invention the external phase may comprise at least one reactive resin.

For the purposes of the present invention reactive resins are precursors or prepolymers which before and during the processing and/or shaping operation are liquid or plastic and give rise after the processing operation, which is normally a shaping operation, to thermosets as a result of polymerization (polycondensation, polyaddition). The polymerization produces a three-dimensionally crosslinked, hard, nonmeltable resin, the thermoset, which thus differs fundamentally from thermoplastics, which, as is known, can always be liquefied again or plastified by renewed heating.

As a result of the usually very high crosslinking density the crosslinked reactive resins exhibit a range of valuable properties, which are the reason why together with the thermoplastics they are among the most used of polymers. These valuable properties include, in particular, hardness, strength, chemical resistance and temperature stability. On the basis of these properties these reactive resins are employed in a very wide variety of fields: for example for the production of fibre reinforced plastics, for insulating materials in electrical engineering, for the production of construction adhesives, laminates, baking varnishes and the like.

Suitable reactive resins in accordance with the invention are all polymeric or oligomeric organic compounds which are provided with suitable reactive groups in sufficient number for a curing reaction. For the purpose of the invention it is irrelevant which crosslinking mechanism or curing mechanism operates in a specific case. Consequently, suitable starting products for the preparation of the inventively modified reactive resins include, in general, all reactive resins which can be processed to thermosets, irrespective of the particular crosslinking mechanism which proceeds in the course of the curing of the particular reactive resin. Not provided by the invention are reactive resins having free-radically polymerizable double bonds, which on account of their particular reactivity are less suitable for the process of the invention. They may be present, if at all, as an optionally additional constituent in the external phase.

The reactive resins which can be used in accordance with the invention as starting products can be divided fundamentally into two groups in accordance with the nature of their crosslinking by addition or condensation.

From the first group of the reactive resins, crosslinked by polyaddition, it is preferred to select one or more epoxy resins, urethane resins and/or air-drying alkyd resins as starting material. Epoxy resins and urethane resins are generally crosslinked by the addition of stoichiometric amounts of a curing agent containing hydroxyl, amino, carboxyl or carboxylic anhydride groups, the curing reaction taking place by addition reaction of the oxirane and/or isocyanate groups of the resin with the corresponding groups of the curing agent. In the case of epoxy resins a further possibility is that of the so-called catalytic curing by polyaddition of the oxirane groups themselves. Air-drying alkyd resins crosslink by autooxidation with atmospheric oxygen.

Examples of the second group of reactive resins, crosslinked by polycondensation, are condensation products of aldehydes, e.g., formaldehyde, with aliphatic or aromatic compounds containing amine groups, e.g., urea or melamine, or with aromatic compounds such as phenol, resorcinol, cresol, xylene, etc., and also furan resins, saturated polyester resins and silicone resins. Curing in this case generally takes place by an increase in temperature accompanied by elimination of water, low molecular mass alcohols or other low molecular mass compounds. As starting material for the inventively modified reactive resins it is preferred to select one or more phenolic resins, resorcinol resins and/or cresol resins, specifically both resoles and novolaks, and also urea-formaldehyde precondensates and melamine-formaldehyde precondensates, furan resins, and saturated polyester resins and/or silicone resins.

Not only the abovementioned reactive resins but also all others suitable for producing thermosets can be modified in the manner proposed in accordance with the invention and, after crosslinking and curing, give rise to thermosets having considerably improved fracture toughness and impact strength, which other essential properties characteristic of the thermosets, such as strength, heat distortion resistance and chemical resistance, remain substantially unaffected. In this case the reactive resins or reactive resin mixtures used in accordance with the invention are liquid at temperatures in the range from 18 to 100° C. Further, the reactive resins or reactive resin mixtures used have an average molecular weight in the range from 200 to 500,000, preferably from 300 to 20,000. As external phase, furthermore, it is also possible in accordance with the invention to use monomers and oligomers. These include in particular those monomeric or oligomeric compounds which can be reacted to form polymers by polyaddition or polycondensation.

The invention possesses considerable advantages in particular when employed in the context of reactive resins. Prior art reactive resins are brittle owing to their highly crosslinked state and have a low impact strength, particularly at relatively low temperatures. The fracture toughness and impact strength of such thermoset polymer can be considerably improved in accordance with the invention without adversely affecting hardness, strength and softening temperature. In accordance with the invention it is therefore possible to prepare reactive resins and, from them, thermosets in which on the one hand the liquid reactive resin is still easy to process despite a high fraction of filler and on the other hand, by virtue of the filling addition of monomodal particles of low diameter, a considerable improvement occurs in the mechanical properties (especially tensile strength, elongation at break or fracture toughness) of the cured thermoset polymer.

In one preferred embodiment of the invention the polymerizable monomers, oligomers and/or prepolymers contain carbon, oxygen, nitrogen and/or sulfur atoms in the main chain. The polymers in question are therefore organic hydrocarbon polymers (with or without heteroatoms); polysiloxanes do not come under this preferred embodiment.

The external fluid phase may with preference comprise polymerizable monomers without radically polymerizable double bonds and also reactive resins.

The external fluid phase may further comprise silanes. The silanes may have hydrolyzable and nonhydrolyzable, optionally functional groups. Examples of hydrolyzable groups are halogen, alkoxy, alkenoxy, acyloxy, oximino and aminoxy groups. Examples of functional, nonhydrolyzable groups are vinyl, aminopropyl, chloropropyl, aminoethylamino propyl, glycidyloxypropyl, mercaptopropyl or methacryloyloxypropyl groups. Examples of nonhydrolyzable nonfunctional groups are monovalent $C_1$ to $C_8$ hydrocarbon radicals. Examples of silanes which can be used in accordance with the invention are: γ-aminopropyltrimethoxysilane, γ-aminopropylmethyldiethoxysilane, γ-aminopropyldimethylmethoxysilane, glycidyloxypropyltrimethoxysilane, glycidyloxypropyldimethylmethoxysilane, methacryloyloxypropyltrimethoxysilane, chloropropyltrimethoxysilane, vinylmethyldimethoxysilane, vinyltrispropenoxysilane, vinyldimethylbutanone oxime silane, vinyltrisbutanone oxime silane, trimethylchlorosilane, vinyldimethylchlorosilane, dimethylchlorosilane, vinylmethylchlorosilane.

The silanes are used preferably in a concentration of from 40 to 200 mol % and with particular preference from 60 to 150 mol % based on the molar amount of silanol groups on the surface.

In the performance of the process of the invention first of all an aqueous silicate solution is introduced. It can be an alkali metal silicate solution, in particular a sodium silicate and or potassium silicate solution. The concentration of this aqueous silicate solution is preferably in the range between 20 and 50% by weight. The preferred ratio of $SiO_2$ to $Na_2O$ is between 2 and 3.

In the next step the silicate is polycondensed to a particle size of from 3 to 50 nm. This can take place, for example, by treating the alkali metal silicate solution with acidic ion exchangers which replace the alkali metal ions with $H^+$ ions and so initiate the desired polycondensation.

The silica sol obtained is adjusted to an alkaline pH (pH>8, preferably >9, more preferably >10, with particular preference between 10 and 12) and in this way is stabilized against further polycondensation or agglomeration of existing particles.

Optionally the sol can be concentrated, for example, by distillation, preferably to an $SiO_2$ concentration of from 30 to 40% by weight.

In the next step the sol is mixed with constituents of the external fluid phase of the dispersion. In this case the constituents of the external fluid phase can be added or mixed in either simultaneously or in two or more substeps in succession.

Thereafter, with particular preference, water and/or other solvent constituents are removed from the dispersion, since the intention is to use the dispersions of the invention to prepare, with particular preference water-free plastics (referred to as water-free nanocomposites). Use may be made of all of the customary separation techniques familiar to the skilled worker, such as, for example, distillation, preferably in vacuo, membrane separation, sedimentation where appropriate, solvent extraction, use of a molecular sieve, etc. In the case of distillation it is possible where appropriate to add solvents which form an azeotrope with water and so act as an azeotropic entrainer. When different solvent constituents require removal, this can also be carried out simultaneously or by means of two or more sequential substeps.

In the context of the invention it is also possible for substeps of the process steps e) and f) of claim 16 to be mixed with one another, so to speak. It is possible, therefore, following the addition of one or more constituents in step e), first to remove one or more solvent constituents in step f) and then to carry out further substeps (addition of material) in step e), again remove other solvent constituents in step f), and so on. Consequently, substeps of the process steps e) and f) of claim 16 can be mixed with one another and swapped with one another.

It is preferred if the silicon dioxide component of a dispersion of the invention is prepared exclusively and hence in its entirety by the stated process. Within the context of the invention it is also possible, however, to prepare some of the silicon dioxide of the dispersion by prior art processes, as long as the disperse phase overall meets the criteria of claim 1. In particular it is possible in the context of the invention to prepare part of the disperse phase by the process of hydrolysis and condensation of organofunctional silanes (especially alkoxy silanes) that was outlined in the introductory part of the description. The silanes in question can be mono-, di-, tri- or tetraalkoxy silanes; there must be a sufficient fraction present of silanes having three or four hydrolyzable groups. Preference is given in particular to mono-, di- or trimethoxy or -ethoxy silanes in which one of the non hydrolyzable radicals is an aliphatic (preferably having 1 to 18 carbon atoms) or aromatic hydrocarbon radical which may additionally contain a functional group, for example, a vinyl, allyl, (meth)acryloyl, glycidyl, halogen, hydroxyl or mercapto group. Any further non hydrolyzable radicals present are preferably methyl or ethyl.

Where part of the disperse phase is prepared in the manner stated by silane hydrolysis, it is possible where appropriate for additional solvents to be added which may serve as solubilizers between silane and external phase of the dispersion. Suitable examples include water-miscible alcohols of low molecular mass (preferably $C_1$ to $C_4$ alcohols), ketones, amines, amides or heterocyclic compounds such as THF or pyridine, for example.

The invention further provides for the use of a dispersion defined above for producing a polymeric material. The polymeric material can be a thermoplastic or thermoset polymer. By way of example mention may be made of polyurethanes, polyureas, epoxy resins, polyester resins, polysiloxanes, and all thermoset polymers that can be prepared from reactive resins.

The polymeric material can on the one hand be a thermoplastic or on the other hand a chemically crosslinked, thermoset or elastomeric polymer. As examples of thermoset and/or elastomeric polymers mention may be made of: polyurethanes, polyureas, epoxy resins, polyester resins, polyimide resins, polysiloxanes, alkyd resins, styrene-butadiene rubber, acrylonitrile-butadiene rubber, oolybutadiene rubber.

As examples of thermoplastic polymers which can be used in accordance with the invention in the external phase mention may be made of the following: polyolefins, polystyrene, styrene-acrylonitrile copolymers, poly-amides, polyvinyl chloride and its copolymers, poly-vinyl alcohols, and polyvinyl acetates and polyvinyl ethers and also copolymers of these substances, polycarbonate, polymethyl acrylates and polymethyl methacrylates, including their copolymers, polyurethanes, polysulfones, polyether ketones, polyesters.

The polymeric materials for the purposes of this invention are not only compact materials; instead, the dispersions of the invention can also be used with advantage as part of the binder in paints, inks and coatings. In these applications it is particularly advantageous that, through the amount of silicon dioxide on the one hand the abrasion resistance, the scratch resistance and also the barrier effect to the penetration of the coating by gases and moisture are increased, but on the other hand, through the narrow particle size distribution, the viscosity is increased to much less of an extent than in the case of silicon dioxide fillers in accordance with the conventional state of the art. This is a considerable advantage particularly in the case of surface coatings.

Furthermore, the polymeric materials modified in accordance with the invention may also be closed-cell or open-cell foams, based for example on polyurethanes, polysiloxanes, polyolefins or polystyrene. The particular advantage of the dispersion of the invention arises in this case from the fact that, owing to the low particle size and the narrow particle distribution, the particles can be present in the thin lamellae of the foam without disrupting the foam structure per se. As a result it becomes possible, for example, to raise the hardness and compressive strength of the foam with its density unchanged or to maintain said properties despite a decrease in density.

A further embodiment of the polymeric materials modified in accordance with the invention are liquid, curable casting and impregnating compounds for the production, for example, of electrical insulating resins or fiber composites. In many applications of electrical insulating resins, e.g., in the casting of coils or transformers, the critical factor is the ability of the impregnating resin to flow as far as possible easily and without defect through the spacings of the coil windings, which are often just a few μm, a task virtually impossible for resins filled with prior art fillers owing to their particle size and irregular distribution. In principle the same applies to the application of impregnating resins in fiber composites, where particularly in the case of highly stressed parts the individual reinforcing fibers are so tightly packed that in the prior art no filled systems at all can be used. In both applications the impregnating resins prepared with the dispersions of the invention are readily able to penetrate the intestacies of the windings or fibers, respectively, owing to the extremely small particle size and the narrow diameter distribution of the silicon dioxide. Accordingly, the advantageous mechanical and thermal properties of the silicon-dioxide-filled resin can be manifested throughout the component.

A further advantageous quality of the polymeric materials modified with the dispersions of the invention is their optical clarity, which is again a result of the extremely low particle size and narrow diameter distribution for silicon dioxide. Especially in the case of plastics which are naturally optically clear, the prior art does not provide any possibility for adding more than just a very small fraction of inorganic fillers to the polymer without detriment to its optical properties. Consequently, in the case of polymer applications where optical clarity is important, it is virtually impossible to improve properties such as hardness or modulus of elasticity, scratch resistance, fracture strength, thermal conductivity, expansion coefficient, diffusion barrier effect, and so on, which in the case of non transparent systems would normally be effected by adding inorganic fillers. In principle this relates to a very large number of polymeric materials and their applications, e.g., polymethyl methacrylate, polycarbonate, polyalkylene terephthalates, a variety of clearcoat systems, for example, for top coats of vehicles, furniture, flooring, printed matter, etc.

By way of example the dispersion of the invention can comprise polyols or polyamines of the type described in more detail above from which polyurethanes and/or polyureas can be produced. The dispersion is then mixed conventionally with polyisocyanates and reacted in order to prepare the desired polymeric materials whose properties have been modified accordingly by the disperse $SiO_2$ phase. In a manner familiar to the skilled worker the polymerization reaction can be implemented in one or more stages, where appropriate at elevated temperature.

Where the dispersion of the invention includes a reactive resin, it can be subjected in a known manner to further processing, by the known single-stage or multistage processes of reactive resin engineering, to give a polymer, preferably a thermoset polymer. Preferably with the addition of catalysts, curing agents or crosslinkers, a three-dimensional polymeric network is developed. Further additives and adjuvants can be added to the reactive resin prior to crosslinking, examples being organic or inorganic fillers, fibres, pigments, flow assistants, reaction accelerants or retardants, plasticizers or the like.

Examples of the invention are illustrated below. All percentages in the examples are by weight, with the indication "parts" referring to parts by mass. The size distribution of the $SiO_2$ particles (also called diameter distribution) is specified in the examples as x±y nm. X here is the peak $d_{max}$ of the distribution curve, y half the half-width of the distribution curve. Accordingly, the half-width of the distribution curve amounts to 2y.

EXAMPLE 1

A commercial aqueous alkali silicate solution having a water content of 47% and a ratio of $SiO_2$ to $Na_2O$ of 2.4 was diluted with demineralized water to a water content of 97%. 100 parts of this diluted solution were passed at a rate of 20 parts per hour through a column packed with a commercially acidic ion exchanger and subsequently was supplied to a distillation receiver in which the incoming deionized silicate solution was held at boiling temperature and the water distilling off was removed from the solution. After the end of the introduction the silica sol formed was concentrated by further heating to 10 parts. The pH was adjusted to 10.5 to 11.

EXAMPLES 2 to 4

Batches of 100 parts of the sol prepared in example 1 were mixed with 2000 parts of isopropanol and the water was removed by atmospheric distillation down to a level, determined by the Karl-Fischer method, of less than 0.1%. Thereafter 80 parts of one of the following polyethers were added with stirring:

Example 2: polypropylenediol (PPG), molar mass (MM) 1000

Example 3: PPG end capped with 15% polyethylene glycol (PEG) MM 4000

Example 4: Polypropylenetriol, MM 6000

Subsequently the volatile constituents were removed by distillation at 50° C. and a vacuum of up to 85 mbar.

The three samples obtained were water-clear. The particle size distribution was measured by means of SANS and for all three samples gave a diameter distribution which matched within the bounds of measurement accuracy and was 47±11 nm.

EXAMPLE 5

Example 1 was repeated with the difference that the water content of the diluted alkali metal silicate solution was adjusted to 98% and the rate of introduction to the distillation receiver was 15 parts per hour. Following concentration, 9 parts of silica sol were obtained. The pH was adjusted to 10.5 to 11.

EXAMPLES 6 to 10

Batches of 100 parts of the sol prepared in example 5 were admixed with 2.5 parts of trimethylmethoxysilane and stirred. Added to these mixtures were 2000 parts of isopropanol and the water was removed by atmospheric distillation down to a level, determined by the Karl-Fischer method, of less than 0.1%. Thereafter 80 parts of the following polyethers were added with stirring:
Example 6: PPG MM 12000
Example 7: PPG with 10% ethylene oxide randomly copolymerized, MM 3000
Example 8: Polypropylenetriol, MM 550
Example 9: Polypropylenetriol end capped with 20% PEG, MM 2000
Example 10: Polytetramethylene glycol, MM 650

Subsequently the volatile constituents were removed by distillation at 50° C. and a vacuum of up to 85 mbar.

The five samples obtained were water-clear. The particle size distribution was measured by means of SANS and for all samples gave a diameter distribution which matched within the bounds of measurement accuracy and was 30±7 nm.

EXAMPLE 11

Example 1 was repeated with the difference that the rate of introduction to the distillation receiver was 30 parts per hour. Following concentration, 15 parts of silica sol were obtained. The pH was adjusted to 10.5 to 11.

EXAMPLE 12

100 parts of the sol prepared in Example 11 were admixed with stirring with 3.9 parts of n-propyltrimethoxysilane, which was stirred in. Thereafter this mixture was stirred into 620 parts of isopropanol and at 40° C. and 85 mbar was concentrated to 113 parts. Subsequently 110 parts of a hydroxyl-containing polyacrylate ("Desmophen A 870 BA", Bayer AG) were added. The volatile constituents were subsequently removed by distillation at 40° C. and 58 mbar in a manner sufficiently gentle that the higher-boiling butyl acetate present in the polyacrylate remained in the dispersion. This gave a water-clear dispersion having a SANS-determined diameter distribution of 8±2.5 nm.

EXAMPLE 13

100 parts of the sol prepared in Example 11 were admixed with 5.9 parts of γ-glycidyloxypropyldiethoxy-methylsilane, with stirring, and then introduced into a solution of 60 parts of a cycloaliphatic epoxy resin ("ERL 4221", Union Carbide) in 620 parts of isopropanol. The volatile constituents were subsequently removed by distillation at 50° C. and 85 mbar. This gave a water-clear dispersion having a SANS-determined diameter distribution of 8±2.5 nm

EXAMPLE 14

100 parts of the sol prepared in Example 11 were admixed with stirring with 588 parts of isopropanol. The mixture was then concentrated at 40° C. and 85 mbar to 147 parts. Thereafter 5.7 parts of γ-glycidyloxy-propyltrimethoxysilane were added with stirring and the mixture was subsequently introduced into a solution of 60 parts of a cycloaliphatic epoxy resin ("ERL 4221", Union Carbide) in 168 parts of isopropanol. The volatile constituents were subsequently removed by distillation at 50° C. and 3 mbar. This gave a water-clear dispersion having a SANS-determined diameter distribution of 8±2 nm.

EXAMPLE 15

Example 1 was repeated with the difference that the rate of introduction to the distillation receiver was 43 parts per hour. Following concentration, 8 parts of silica sol were obtained. The pH is adjusted to 10.5 to 11.

EXAMPLE 16

100 parts of the sol prepared in example 15 were admixed with 5.6 parts of trimethoxyphenylsilane and stirred. Thereafter this mixture was stirred in 610 parts of isopropanol and concentrated at 40° C. and 85 mbar to 118 parts. Subsequently 225 parts of isopropyl acetate were added and the mixture was concentrated again by distillation at 40° C. and 85 mbar to 134 parts. This mixture was then introduced into 125 parts of a 50% strength solution of bisphenol A epoxy resin ("Epilox A 17-01", Leuna Harze GmbH) in isopropyl acetate and subsequently the volatile constituents were removed by distillation at 50° C. and 3 mbar. This gave a slightly opaque dispersion having a SANS-determined diameter distribution of 16±5 nm.

EXAMPLE 17

100 parts of the sol prepared in example 15 were admixed with 2.8 parts of methoxytrimethylsilane and stirred. Thereafter this mixture was stirred in 820 parts of isopropanol and concentrated at 40° C. and 85 mbar to 118 parts. This mixture was then stirred with 423 parts of a 15% strength solution of bisphenol F epoxy resin ("Epilox F 16-01", Leuna Harze GmbH) in isopropyl acetate and subsequently the volatile constituents were removed by distillation at 50° C. and 3 mbar. This gave a slightly opaque dispersion having a SANS-determined diameter distribution of 17±5 nm.

EXAMPLE 18

Batches of 100 parts of the sol prepared in Example 15 were admixed with 5.3 parts of phenyltrimethoxysilane and stirred. 1000 parts of isopropanol were added to these mixtures which were then concentrated at 40° C. and 85 mbar to 120 parts in each case. Subsequently 220 parts of isopropyl acetate were added to each of the mixtures, which were again concentrated by distillation at 40° C. and 85 mbar to 120 parts. Thereafter 135 parts of a 50% strength isopropyl acetate solution of the following polyester polyols were added in each case:
Example a: Branched polyester polyol ("Desmophen 1100", Bayer AG)
Example b: Polycarbonate-polyester polyol ("Desmophen C 200", Bayer AG)
Example c: Polycaprolactonpolyol ("TONE 2241", Dow Chemical)

Subsequently the volatile constituents were removed by distillation at 50° C. and a vacuum of up to 85 mbar. The three samples obtained were water-clear. The particle size distribution was measured by means of SANS and on all three samples gave a diameter distribution which was the same within the bounds of measurement accuracy and was 17±5 nm.

EXAMPLE 19

100 parts of the sol prepared in Example 15 were admixed with 4.5 parts of n-propyltrimethoxysilane and stirred. Thereafter this mixture was stirred into a solution of 80 parts of c-caprolactam in 520 parts of n-propanol. The volatile constituents were subsequently removed by distillation at 60° C. and a vacuum of up to 85 mbar. This gave a water-clear dispersion which at room temperature solidifies to a colorless solid. Melting at 70° C. again gives a water-clear dispersion having a SANS-determined diameter distribution of 16±7 nm.

EXAMPLE 20

100 parts of the sol prepared in Example 15 were admixed with stirring with 4.5 parts of propyltrimethoxysilane with stirring and subsequently introduced into a solution of 38 parts of an adipate-based plasticizer ("Plasticiser 109", hanse chemie GmbH) in 522 parts of isopropanol. The volatile constituents were removed by distillation at 50° C. and 3 mbar. This gave a yellow, water-clear dispersion having a SANS-determined diameter distribution of 18±5 nm.

EXAMPLE 21

100 parts of the sol prepared in Example 15 were admixed with 5.8 parts of phenyltrimethoxysilane and stirred. 1000 parts of isopropanol were added to this mixture, which was then concentrated at 40° C. and 85 mbar to 122 parts. Subsequently 225 parts of isopropyl acetate were added and the mixture was again concentrated by distillation at 40° C. and 85 mbar to 110 parts. 100 parts of PMMA molding compound pellets ("Plexiglas 6N", Rohm GmbH) were melted in a twin-screw devolatilizing extruder ("ZSK 25", Werner Pfleiderer). Under a pressure of 42 bar 100 parts of the above-prepared isopropyl acetate sol were fed in from the side, the components were mixed homogeneously and then the volatile constituents, in a two-stage devolatilizing operation, were blown off and degassed under vacuum. By means of a downstream pelletizer water-clear colorless pellets were obtained with a SANS-determined diameter distribution of 17±7 nm.

These pellets were used with a commercial injection molding machine to produce specimens whose mechanical and thermal characteristics were determined and compared with unmodified "Plexiglas 6N". The resulting values were as follows:

| | | | Measurement value | |
|---|---|---|---|---|
| Characteristic | Unit | Standard | Unmodified | Modified |
| Tensile elasticity modulus | MPa | ISO 527 | 3,200 | 4,900 |
| Breaking stress | MPa | ISO 527 | 67 | 103 |
| Elongation at break | % | ISO 527 | 3 | 3 |
| Softening temperature | ° C. | ISO 306 | 96 | 115 |
| Linear expansion coefficient | $10^{-6} K^{-1}$ | ASTM E 831 | 80 | 60 |
| Optical transmittance | % | DIN 5036 | 92 | 90 |

The example demonstrates the considerably improved mechanical and thermal characteristics of the Plexiglas, without marked detriment to its optical properties from the addition of the silicon dioxide.

EXAMPLE 22

100 parts of the sol prepared in Example 15 were admixed with stirring with 588 parts of isopropanol. The mixture was then concentrated at 40° C. and 85 mbar to 147 parts. Thereafter 5.7 parts of γ-glycidyloxypropyltrimethoxysilane were added with stirring and the mixture was subsequently introduced into a solution of 60 parts of a cycloaliphatic epoxy resin ("ERL 4221", Union Carbide) in 168 parts of isopropanol. The volatile constituents were subsequently removed by distillation at 50° C. and 2 mbar. This gave a water-clear dispersion having a SANS-determined diameter distribution of 15±4 nm.

EXAMPLE 23

In this example the rheological properties of resins and polyether polyols filled on the one hand with pyrogenic silica of the prior art and on the other hand with $SiO_2$ dispersions of the invention are compared. AEROSIL® R8200 is a pyrogenic silica prepared by flame hydrolysis from silicon tetrachloride, obtainable from Degussa.

TABLE 1

Viscosities of $SiO_2$-filled resins and polyether polyols

| Resin/polyether polyol (Manufacturer) | $SiO_2$ content [%] | Type of $SiO_2$ particles | η (25° C.) [mPa · s] |
|---|---|---|---|
| ERL 4221 (Union Carbide) | 0 | — | 381 |
| ERL 4221 (Union Carbide) | 23 | Ex. 22 | 422 |
| ERL 4221 (Union Carbide) | 40 | Ex. 22 | 25810 |
| ERL 4221 (Union Carbide) | 5 | AEROSIL ® R8200 | 491 |
| ERL 4221 (Union Carbide) | 23 | AEROSIL ® R8200 | paste |
| Baycoll BT 1380 (Bayer) | 0 | — | 595 |
| Baycoll BT 1380 (Bayer) | 20 | Ex. 8 | 1030 |
| Baycoll BT 1380 (Bayer) | 50 | Ex. 8 | 19800 |
| Baycoll BT 1380 (Bayer) | 5 | AEROSIL ® R8200 | 815 |
| Baycoll BT 1380 (Bayer) | 10 | AEROSIL ® R8200 | 1487 |
| Baycoll BT 1380 (Bayer) | 20 | AEROSIL ® R8200 | paste |
| BisGMA/TEDMA | 0 | — | 1194 |
| BisGMA/TEDMA | 16 | Ex. 12 | 2001 |
| BisGMA/TEDMA | 45 | Ex. 12 | 42900 |
| BisGMA/TEDMA | 5 | AEROSIL ® R8200 | 1864 |
| BisGMA/TEDMA | 10 | AEROSIL ® R8200 | 3899 |
| BisGMA/TEDMA | 20 | AEROSIL ® R8200 | paste |

It is seen that in accordance with the invention it is possible to realize high $SiO_2$ contents without an excessive increase in viscosity and hence without processing being made more difficult or impossible. In contrast, an AEROSIL content of approximately 20% by weight already regularly leads to a pastelike consistency of the resin or polyether polyol.

EXAMPLE 24

The beneficial effect of $SiO_2$ dispersions of the invention on the mechanical properties of polymers is elucidated using epoxy resins as example. In this example the epoxy resin ERL 4221 is mixed with the $SiO_2$ dispersion of Example 22 to give the $SiO_2$ contents indicated in Tab. 2. For UV curing (c to e) the samples were admixed with 1% of UV initiator ("CYRACURE® UVI-6974", from Union Carbide), placed in aluminum trays and degassed at 60° C. and 1 mbar for 15 minutes. Subsequently these samples were irradiated for 10 minutes with a UV lamp (UVASPOT 400 H, from Dr. K. Honle GmbH) from a distance of 20 cm and heated at 160° C. for 1 hour. For thermal curing (a and b) the epoxy equivalent weight was determined in accordance with the standard DIN 16 945 and one equivalent of a cycloaliphatic anhydride ("ALBIDUR HE 600", hanse chemie GmbH) was added. The samples are placed in aluminum trays and degassed at 60° C. and 1 mbar for 15 minutes. Curing takes place in 4 stages: 90 minutes at 90° C., 120 minutes at 120° C., 120 minutes at 140° C. and 60 minutes at 160° C.

For the subsequent fracture-mechanical investigations to determine the fracture toughness $K_{IC}$, the fracture energy $G_{IC}$ and the elasticity modulus E, CT standard test specimens with an edge length of 33 mm were milled from the compact material and were tested in accordance with the standard ASTM E 399-83 under quasistatic load. Flexural tests were carried out in three-point bending tests in accordance with the standard DIN 53 452.

TABLE 2

Results of fracture-mechanical investigation

| | SiO$_2$ content [%] | Curing | $K_{IC}$ [MPa·m$^{1/2}$] | $G_{IC}$ [J/m$^2$] | E [MPa] |
|---|---|---|---|---|---|
| a | 0 | HE600 | 0.47 ± 0.05 | 77.2 ± 22.0 | 3053 ± 276 |
| b | 23 | HE600 | 0.78 ± 0.02 | 147.7 ± 7.9 | 4146 ± 122 |
| c | 0 | UV | 0.28 ± 0.05 | 26.2 ± 8.4 | 3156 ± 81 |
| d | 23 | UV | 0.43 ± 0.04 | 47.0 ± 6.1 | 3893 ± 191 |
| e | 40 | UV | 0.51 ± 0.04 | 45.7 ± 7.6 | 5795 ± 276 |

The results of the experiment show that by means of the SiO$_2$ dispersion of the invention fracture toughness, fracture energy and elasticity modulus of the polymeric material can be substantially improved.

The invention claimed is:

1. A silicon dioxide dispersion, comprising:
   a) an external fluid phase comprising:
      i) at least one of polymers and/or polymerizable constituents convertible to polymers by nonradical reactions, said polymerizable constituents selected from a group consisting of polymerizable monomers, oligomers and/or prepolymers, wherein said polymerizable constituents comprise polymerizable monomers that lack radically polymerizable double bonds and/or reactive resins; and
      ii) silanes; and
   b) a disperse phase comprising amorphous silicon dioxide particles comprising silanol groups on their surfaces, wherein said disperse phase is from 30-80% by weight of said dispersion;
   wherein said silanes in said external phase are present in an amount of 60-150 mol % of the molar amount of the silanol groups on the surface of the amorphous silicon dioxide particles of said disperse phase;
   wherein the average particle size $d_{max}$ of said amorphous silicon dioxide particles as measured by small-angle neutron scattering (SANS) is between 3 and 50 nm and wherein the maximum half-width of the distribution curve is not more than 1.5 $d_{max}$; and
   wherein said dispersion is water-free.

2. The dispersion of claim 1, wherein the average particle size of said amorphous silicon dioxide particles is between 6 and 40 nm.

3. The dispersion of claim 1, wherein the average particle size of said amorphous silicon dioxide particles is between 8 and 30 nm.

4. The dispersion of claim 1, wherein the average particle size of said amorphous silicon dioxide particles is between 10 and 25 nm.

5. The dispersion of claim 1, wherein the half-width of the distribution curve is not more than 1.2 $d_{max}$.

6. The dispersion of claim 1, wherein the half-width of the distribution curve is not more than $d_{max}$.

7. The dispersion of claim 1, wherein the half-width of the distribution curve is not more than 0.75 $d_{max}$.

8. The dispersion of claim 1, wherein said external fluid phase is from 30 to 70% by weight of said dispersion.

9. The dispersion of claim 1, wherein said external fluid phase is from 40 to 70% by weight of said dispersion.

10. The dispersion of claim 1 wherein said disperse phase is from 30-70% by weight of said dispersion.

11. The dispersion of claim 1, wherein said disperse phase is from 30-60% by weight of said dispersion.

12. The dispersion of claim 1, wherein said amorphous silicon dioxide particles are substantially spherical.

13. The dispersion of claim 1, further comprising auxiliaries selected from the group consisting of solvents, plasticizers, crosslinkers, catalysts, stabilizers, dispersants, curing agents, reaction mediators, and agents for influencing the fluidity of the dispersion.

14. The dispersion of claim 1, wherein said external fluid phase comprises at least one substance selected from the group consisting of polyols, polyamines, linear or branched polyglycol ethers, polyesters, and polylactones.

15. The dispersion of claim 1, wherein said external fluid phase comprises at least one reactive resin.

16. The dispersion of claim 1, wherein one or more of said polymerizable monomers, oligomers, or prepolymers comprise main chains, and wherein said main chains comprise one or more C, O, N or S atoms.

17. A process for producing a polymeric material comprising the use of a silicon dioxide dispersion of claim 1.

18. The process of claim 17, wherein said polymeric material produced is selected from the group consisting of polyurethanes, polyureas, epoxy resins, polyester resins, and polysiloxanes.

19. The process of claim 17, wherein said polymeric material produced is a thermoset.

20. The process of claim 17, wherein said polymeric material produced is a thermoplastic.

21. The process of claim 17, wherein said polymeric material produced comprises a polymeric coating, a paint, an ink, or a foam.

22. A process for preparing a silicon dioxide dispersion, comprising:
   a) providing:
      i) an aqueous silicate solution,
      ii) one or more constituents of an external fluid phase,
   b) polycondensing said aqueous silicate solution to a silicate particle size of 3-50 nm to produce a silica sol,
   c) adjusting said silica sol to an alkaline pH,
   d) mixing said silica sol with said one or more constituents of an external fluid phase to produce a dispersion and
   e) removing water from said dispersion to produce a silicon dioxide dispersion comprising:
      1) an external fluid phase comprising:
         i) at least one of polymers and/or polymerizable constituents convertible to polymers by nonradical reactions, said polymerizable constituents selected from a group consisting of polymerizable monomers, oligomers and/or prepolymers, wherein said polymerizable constituents comprise polymerizable monomers that lack radically polymerizable double bonds and/or reactive resins; and
         ii) silanes; and
      2) a disperse phase comprising amorphous silicon dioxide particles comprising silanol groups on their surfaces, wherein said disperse phase is from 30-80% by weight of said dispersion;
      wherein said silanes in said external phase are present in an amount of 60-150 mol % of the molar amount of silanol groups on the surface of the amorphous silicon dioxide particles of said disperse phase; and wherein the average particle size $d_{max}$ of said amorphous silicon dioxide particles as measured by small-angle neutron scattering (SANS) is between 3 and 50 nm and wherein the maximum half-width of the distribution curve is not more than 1.5 $d_{max}$ wherein said dispersion is water-free.

23. The process of claim 22, further comprising concentrating said silica sol prior to said mixing of the silica sol with said external fluid phase.

24. The process of claim 22, further comprising removing other solvent constituents from said dispersion.

25. The process of claim 24, wherein said silica sol is concentrated to a concentration of 30-40% by weight.

26. The process of claim 22, wherein said aqueous silicate solution is an alkali metal silicate solution.

27. The process of claim 26, wherein said alkali metal silicate solution comprises a sodium silicate solution or potassium silicate solution.

28. The process of claim 22, wherein the concentration of said aqueous silicate solution is 20-50% by weight.

29. The process of claim 22, wherein said silica sol is adjusted to a pH of between 10 and 12.

30. The process of claim 22, wherein water is removed by means of a process selected from the group consisting of distillation, membrane separation, extraction, and use of a molecular sieve.

* * * * *